US011970081B2

(12) United States Patent
Lee et al.

(10) Patent No.: US 11,970,081 B2
(45) Date of Patent: Apr. 30, 2024

(54) BATTERY CHARGING APPARATUS AND METHOD FOR VEHICLE (71) Applicants: HYUNDAI MOTOR COMPANY, Seoul (KR); KIA Motors Corporation, Seoul (KR)

(72) Inventors: Sangkyu Lee, Yongin-si (KR); Young Chan Byun, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 254 days.

(21) Appl. No.: 17/102,052

(22) Filed: Nov. 23, 2020

(65) Prior Publication Data
US 2022/0001770 A1 Jan. 6, 2022

(30) Foreign Application Priority Data

Jul. 6, 2020 (KR) .................. 10-2020-0083094

(51) Int. Cl.
*B60L 58/19* (2019.01)
*B60L 53/53* (2019.01)
(Continued)

(52) U.S. Cl.
CPC .............. *B60L 58/19* (2019.02); *B60L 53/53* (2019.02); *H01M 10/425* (2013.01);
(Continued)

(58) Field of Classification Search
CPC ...... B60L 58/19; B60L 53/53; B60L 2240/54;
B60L 2240/547; B60L 2240/549; B60L 58/21; B60L 53/11; H01M 10/425; H01M 10/44; H01M 2220/20; H02J 7/0024; H02J 7/00714; H02J 2207/40; H02J 2310/48; Y02E 60/10; Y02T 10/70
(Continued)

(56) References Cited

U.S. PATENT DOCUMENTS 8,334,674 B2 * 12/2012 Kim ................. H01M 10/4207
320/124
9,260,033 B2 * 2/2016 Hayashida ........... G01R 31/382
(Continued)

FOREIGN PATENT DOCUMENTS

CN 204559194 U 8/2015
EP 3360719 B1 * 9/2020 ............. B60L 1/003
(Continued)

*Primary Examiner* — M Baye Diao
(74) *Attorney, Agent, or Firm* — Slater Matsil, LLP (57) ABSTRACT A battery charging apparatus and method for a vehicle are provided. The charging apparatus for the vehicle includes a third switching element provided between a first battery and a second battery, configured to electrically connect or disconnect the first battery and the second battery; a first switching element configured to supply or cut off a charging current supplied from outside to the first battery; a second switching element configured to supply or cut off the charging current supplied from the outside to the second battery; and a controller configured to control the first switching element, the second switching element, and the third switching element in order to selectively charge at least one of the first battery or the second battery.

21 Claims, 4 Drawing Sheets (51) Int. Cl.
*H01M 10/42* (2006.01)
*H01M 10/44* (2006.01)
*H02J 7/00* (2006.01)

(52) U.S. Cl.
CPC ........... *H01M 10/44* (2013.01); *H02J 7/0024* (2013.01); *B60L 2240/54* (2013.01); *H01M 2220/20* (2013.01)

(58) Field of Classification Search
USPC ........................................................ 320/104
See application file for complete search history.

(56) References Cited

U.S. PATENT DOCUMENTS

| | | | | |
|---|---|---|---|---|
| 10,305,298 | B2* | 5/2019 | Kristensen | H02J 7/0013 |
| 10,630,098 | B2* | 4/2020 | Sakakibara | B60L 53/20 |
| 10,923,924 | B2* | 2/2021 | Kobayashi | H01M 10/4264 |
| 11,001,150 | B2* | 5/2021 | Hidaka | B60L 58/22 |
| 11,050,268 | B2* | 6/2021 | Oishi | B60L 53/62 |
| 11,152,797 | B2* | 10/2021 | Jaensch | H01M 10/482 |
| 11,167,662 | B2* | 11/2021 | Strasser | B60L 58/12 |
| 11,431,184 | B2* | 8/2022 | Takamatsu | B60L 53/24 |
| 2005/0242748 | A1* | 11/2005 | Nagahara | H05K 7/20963 |
| | | | | 315/169.4 |
| 2015/0048795 | A1* | 2/2015 | Hashimoto | H02J 7/0034 |
| | | | | 320/126 |
| 2020/0185936 | A1* | 6/2020 | Oishi | H02J 7/0024 |
| 2020/0247269 | A1* | 8/2020 | Botts | B60L 58/20 |

FOREIGN PATENT DOCUMENTS

| | | |
|---|---|---|
| JP | 6-84546 A | 3/1994 |
| KR | 10-2018-0051732 A | 5/2018 |
| KR | 10-2019-0027450 A | 3/2019 |
| KR | 10-21797180000 B1 | 11/2020 |

* cited by examiner

BATTERY CHARGING APPARATUS AND
METHOD FOR VEHICLE

CROSS-REFERENCE TO RELATED
APPLICATION(S)

The present application claims priority to and the benefit of Korean Patent Application No. 10-2020-0083094, filed on Jul. 6, 2020, the disclosure of which is incorporated by reference in its entirety.

TECHNICAL FIELD

The present disclosure relates to a vehicle, and more particularly, to an apparatus and method for charging a battery in the vehicle.

BACKGROUND

As the development of eco-friendly vehicles (such as electric vehicles or hybrid vehicles) is accelerating, the mileage of eco-friendly vehicles is also increasing.

A capacity of a battery has also increased significantly to drive hundreds of kilometers or more with one full charge. In order to charge the battery with increased capacity in a shorter time, a voltage of the battery is also being developed from 400V to 800V. However, most of high-speed chargers that are currently available only respond to 400V-class batteries, but in many cases do not support 800V class batteries. Although the spread of 800V-class high-speed chargers is increasing, 400V-class high-speed chargers are still mostly.

For this reason, eco-friendly vehicles with 800V-class batteries must be able to be charged in both 400V-class high-speed chargers and 800V-class high-speed chargers. For this, in general, a voltage of the 400V-class charger is boosted inside the vehicle to charge the 800V-class battery.

In order to boost the voltage of the 400V-class charger inside the vehicle, a boost converter must be provided in the vehicle. In this case, a noise may occur during a boosting process. The noise generated during the boosting process can cause charging failure. In addition, when a filter for blocking noise is provided, it can be the cause of an increase in vehicle prices.

SUMMARY

An aspect of the disclosure is to enable a vehicle to correspond to a plurality of external chargers having different charging voltages without using a separate boost converter.

Additional aspects of the disclosure will be set forth in part in the description which follows and, in part, will be obvious from the description, or may be learned by practice of the disclosure.

In accordance with an aspect of the disclosure, a charging apparatus for a vehicle may include a third switching element provided between a first battery and a second battery, configured to electrically connect or disconnect the first battery and the second battery; a first switching element configured to supply or cut off a charging current supplied from the outside to the first battery; a second switching element configured to supply or cut off the charging current supplied from the outside to the second battery; and a controller configured to control on/off of the first switching element, the second switching element, and the third switching element in order to selectively charge each or all of the first battery and the second battery.

The controller may be configured to variably adjust a magnitude of the charging current supplied to each of the first battery and the second battery so that the charging amounts of the first battery and the second battery are equal to each other.

The first switching element may include a first transistor configured to adjust the supply amount of the charging current. The second switching element may include a second transistor configured to adjust the supply amount of the charging current.

The first switching element may further include a first relay configured to control the supply or cut-off of the charging current. The second switching element may further include a second relay configured to control the supply or cut off of the charging current.

The controller may be configured to control the first battery and the second battery to be charged as a single battery by turning on the third switching element and turning off the first switching element and the second switching element.

The controller may be configured to control the first battery and the second battery to be independently charged by turning off the third switching element and turning on the first switching element and the second switching element.

The controller may be configured to control only one of the first battery and the second battery to be independently charged by turning off the third switching element, and turning on one of the first switching element and the second switching element and turning off the other.

The controller may be configured to control the first switching element, the second switching element, and the third switching element so that each or all of the first battery and the second battery are selectively charged in response to a charging capacity of an external charger supplying the charging current.

In accordance with another aspect of the disclosure, in a method of controlling a charging apparatus for a vehicle, the charging apparatus including a third switching element provided between a first battery and a second battery, configured to electrically connect or disconnect the first battery and the second battery, a first switching element configured to supply or cut off a charging current supplied from the outside to the first battery, and a second switching element configured to supply or cut off the charging current supplied from the outside to the second battery. The method may include identifying, by a controller, a charging capacity of an external charger supplying the charging current; and controlling, by the controller, the first switching element, the second switching element, and the third switching element so that each or all of the first battery and the second battery are selectively charged in response to the charging capacity of the external charger.

The method may further include variably adjusting, by the controller, a magnitude of the charging current supplied to each of the first battery and the second battery so that the charging amounts of the first battery and the second battery are equal to each other.

The first switching element may include a first transistor configured to adjust the supply amount of the charging current. The second switching element may include a second transistor configured to adjust the supply amount of the charging current.

The first switching element may further include a first relay configured to control the supply or cut-off of the charging current. The second switching element may further include a second relay configured to control the supply or cut off of the charging current.

The method may further include controlling, by the controller, the first battery and the second battery to be charged as a single battery by turning on the third switching element and turning off the first switching element and the second switching element.

The method may further include controlling, by the controller, the first battery and the second battery to be independently charged by turning off the third switching element and turning on the first switching element and the second switching element.

The method may further include controlling, by the controller, only one of the first battery and the second battery to be independently charged by turning off the third switching element, and turning on one of the first switching element and the second switching element and turning off the other.

In accordance with an aspect of the disclosure, a vehicle may include a first battery and a second battery; a third switching element provided between the first battery and the second battery, configured to electrically connect or disconnect the first battery and the second battery; a first switching element configured to supply or cut off a charging current supplied from the outside to the first battery; a second switching element configured to supply or cut off the charging current supplied from the outside to the second battery; and a controller configured to control on/off of the first switching element, the second switching element, and the third switching element in order to selectively charge each or all of the first battery and the second battery.

In accordance with another aspect of the disclosure, in a method of controlling a vehicle, the vehicle including a first battery and a second battery, a third switching element provided between the first battery and the second battery, configured to electrically connect or disconnect the first battery and the second battery, a first switching element configured to supply or cut off a charging current supplied from the outside to the first battery, and a second switching element configured to supply or cut off the charging current supplied from the outside to the second battery. The method may include identifying, by a controller, a charging capacity of an external charger supplying the charging current; and controlling, by the controller, the first switching element, the second switching element, and the third switching element so that each or all of the first battery and the second battery are selectively charged in response to the charging capacity of the external charger.

DRAWINGS

These and/or other aspects of the disclosure will become apparent and more readily appreciated from the following description of the embodiments, taken in conjunction with the accompanying drawings of which.

DETAILED DESCRIPTION

Figure 1:
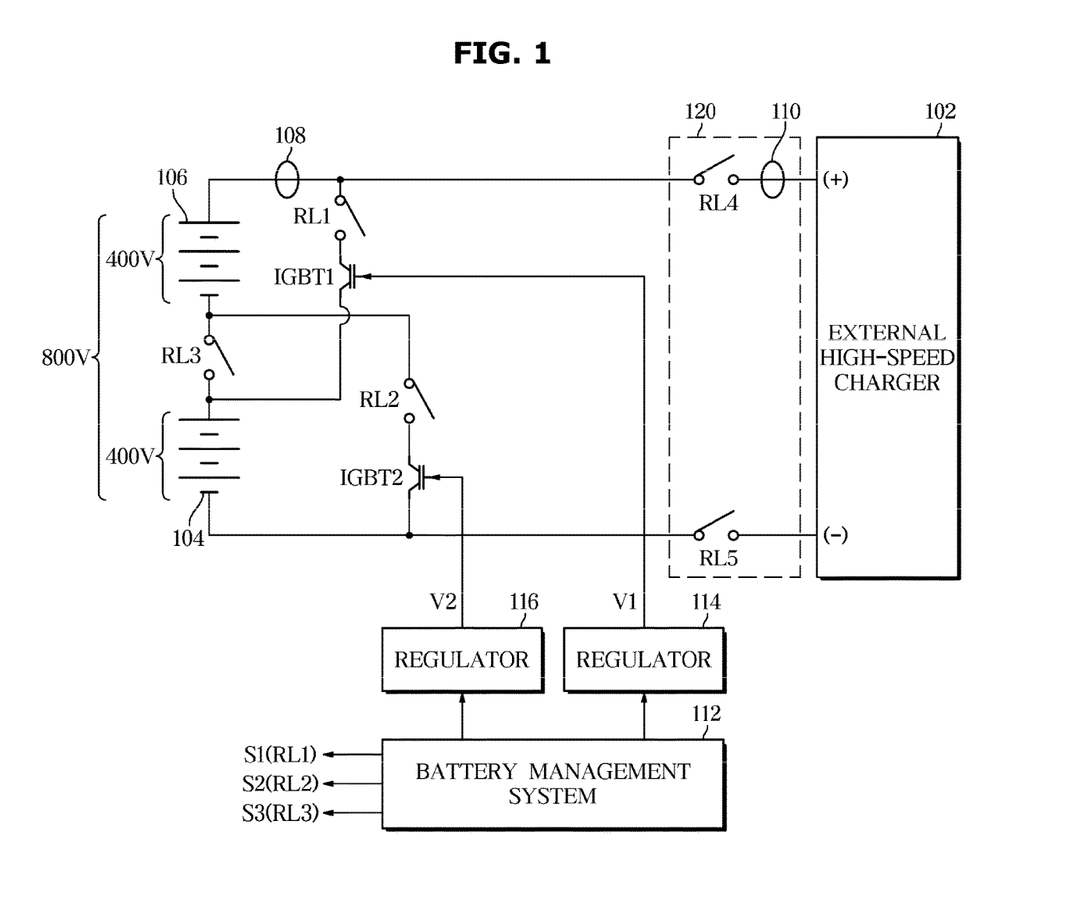
FIG. 1 is a view illustrating a charging apparatus for a vehicle in one form of the present disclosure.

FIG. 1 is a view illustrating a charging apparatus for a vehicle in some forms of the present disclosure.

Referring to FIG. 1, reference numeral 102 denotes an external high-speed charger provided outside a vehicle. The external high-speed charger 102 is electrically connected to a charging apparatus for the vehicle according to the embodiment of the disclosure through a high-voltage relay assembly 120 by a plug-in of a charging cable. The high-voltage relay assembly 120 may include a current sensor 110 for detecting a magnitude of a current flowing through two high-voltage relays RL4 and RL5 and (+) terminals connected to the (+) and (−) terminals of the external high-speed charger 102, respectively. When the external high-speed charger 102 and a charger for the vehicle according to the embodiment of the disclosure are connected by the plug-in of the charging cable, the two high-voltage relays RL4 and RL5 of the high-voltage relay assembly 102 are turned on to supply the current.

The charging apparatus for the vehicle may be provided to charge high-voltage batteries 104 and 106 provided in the vehicle. The high-voltage batteries 104 and 106 illustrated in FIG. 1 are composed of two 400V-class high-voltage batteries 104 and 106. A third high-voltage relay RL3, which is a third switching element, may be provided between the two 400V-class high-voltage batteries 104 and 106, that is, between the first high-voltage battery 104 and the second high-voltage battery 106. Therefore, when the third high-voltage relay RL3 is turned off, the two 400V-class high-voltage batteries 104 and 106 are electrically separated from each other to operate as separate 400V-class batteries. Conversely, when the third high-voltage relay RL3 is turned on, the two 400V-class high-voltage batteries 104 and 106 are electrically connected to each other to operate as the 800V-class battery.

The first high-voltage battery 104 may be independently charged through a first high-voltage relay RL1 and a first transistor IGBT1 constituting a first switching element. That is, when the first high-voltage relay RL1 and the first transistor IGBT1 are turned on while the third high-voltage relay RL3, a second high-voltage relay RL2, and a second transistor IGBT2 are turned off, the first high-voltage battery 104 is independently charged. The first switching element may be configured by a combination of the first high-voltage relay RL1 and the first transistor IGBT1, or may be configured by the first transistor IGBT1 alone.

The second high-voltage battery 106 may be independently charged through the second high-voltage relay RL2 and the second transistor IGBT2 constituting a second switching element. That is, when the second high-voltage relay RL2 and the second transistor IGBT2 are turned on while the third high-voltage relay RL3, the first high-voltage relay RL1, and the first transistor IGBT1 are turned off, the first high-voltage battery 104 is independently charged. The second switching element may be configured by a combination of the second high-voltage relay RL2 and the second transistor IGBT2, or may be configured by the second transistor IGBT2 alone.

When the first high-voltage relay RL1, the first transistor IGBT1, the second high-voltage relay RL2, and the second transistor IGBT2 are turned off while the third high-voltage relay RL3 is turned off, both the first high-voltage battery 104 and the second high-voltage battery 106 may be independently charged.

When only the third high-voltage relay RL3 is turned on by itself while the first high-voltage relay RL1, the first transistor IGBT1, the second high-voltage relay RL2, and the second transistor IGBT2 are turned off, the first high-voltage battery 104 and the second high-voltage battery 106 are electrically connected in series to be charged as one 800V-class battery.

The first transistor IGBT1 and the second transistor IGBT2 are insulated gate bipolar transistors IGBTs, which are high-power switches. The first transistor IGBT1 may be controlled by a gate voltage V1 supplied through a regulator 114 under a control of a battery management system 112 operating as a controller. The second transistor IGBT2 may be also controlled by a gate voltage V2 supplied through another regulator 116 under the control of the battery management system 112.

The operating regions of the first and second transistors IGBT1 and IGBT2, respectively, may be divided into a linear region, a saturation region, and a cut-off region. In the embodiment of the disclosure, by operating each of the first transistor IGBT1 and the second transistor IGBT2 in the saturation region and the cut-off region through the magnitude of the gate voltages V1 and V2, the first transistor IGBT1 and the second transistor IGBT2 are simply acted as an on/off switch. By operating each of the first transistor IGBT1 and the second transistor IGBT2 in the linear region through the magnitude of the gate voltages V1 and V2, the magnitude of current flowing through each of the first and second transistors IGBT1 and IGBT2 is adjusted. Adjusting the magnitude of the current through each of the first and second transistors IGBT1 and IGBT2 as described above is to equally (evenly) charge the first high-voltage battery 104 and the second high-voltage battery 106 by controlling the amount of the current flowing to the first high-voltage battery 104 and the second high-voltage battery 106 equally.

In FIG. 1, the current sensor 110 may measure the magnitude of a charging current Icharge supplied through the (+) terminal of the external high-speed charger 102. Another current sensor 108 may measure the magnitude of the current flowing through a current path between the first high-voltage relay RL1 and the (+) electrode of the second high-voltage battery 106 (see I2 in FIGS. 2 and 3).

The charging apparatus for the vehicle according to the embodiment is capable of independently charging 800V-class high-voltage batteries 104 and 106 as two 400V-class high-voltage batteries 104 and 106. Most of the external high-speed chargers currently in use are 400V-class models, and the spread of 800V-class external high-speed chargers is increasing for faster charging. The charging apparatus for the vehicle according to the embodiment is capable of independently charging 800V-class high-voltage batteries 104 and 106 as two 400V-class high-voltage batteries 104 and 106 in order to cope with the 400V-class external high-speed charger as well as the 800V-class external high-speed charger.

In the vehicle according to an embodiment of the disclosure, a change in the charging method according to the capacity of the external high-speed charger 102 will be described in detail with reference to FIGS. 2 to 4.

Figure 2:
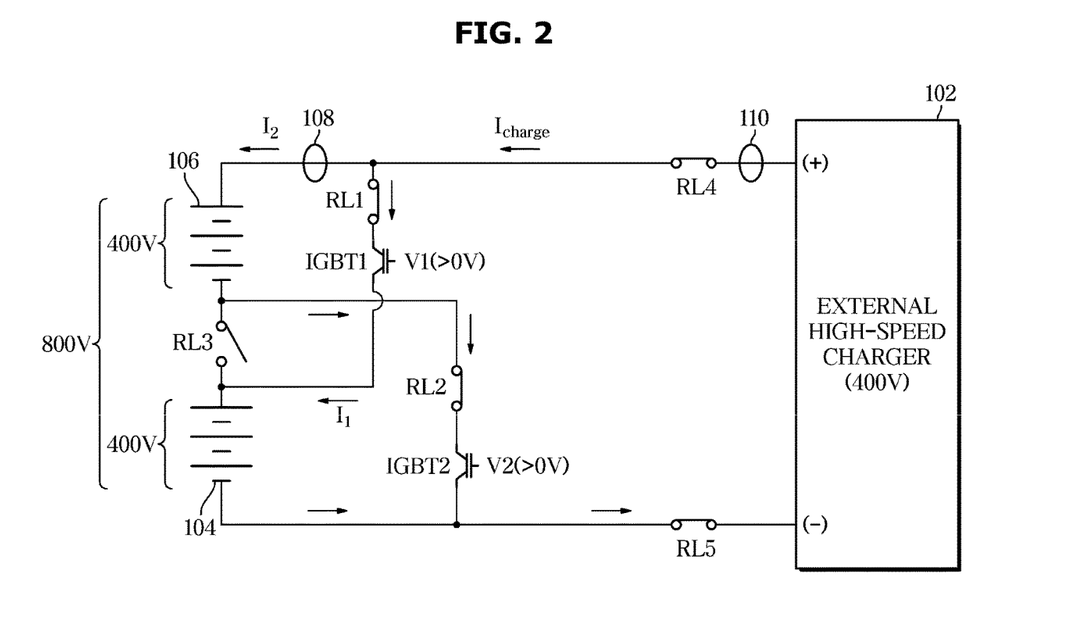
FIG. 2 is a view illustrating charging control for responding to a 400V-class external high-speed charger in a charging apparatus for a vehicle in one form of the present disclosure.

FIG. 2 is a view illustrating charging control for responding to a 400V-class external high-speed charger in a charging apparatus for a vehicle in some forms of the present disclosure. The external high-speed charger 102 illustrated in FIG. 2 is the 400V-class model. In this case, the charging apparatus for the vehicle according to the embodiment electrically divides the 800V-class high-voltage batteries 104 and 106 into the two 400V-class high-voltage batteries 104 and 106 and perform independent charging for the two 400V-class high-voltage batteries 104 and 106.

As illustrated in FIG. 2, the first high-voltage relay RL1, the first transistor IGBT1, the second high-voltage relay RL2, the second transistor IGBT2 are turned on while the third high-voltage relay RL3 is turned off. Through this control, the first high-voltage battery 104 and the second high-voltage battery 106 are independently charged as the 400V-class battery, respectively.

The charging of the first high-voltage battery 104 and the second high-voltage battery 106 may be performed by the charging current Icharge supplied from the external high-speed charger 102. In the case of FIG. 2, the charging current Icharge may be supplied by being divided into the first high-voltage battery 104 and the second high-voltage battery 106. Ideally, a first current I1 supplied to the first high-voltage battery 104 and a second current I2 supplied to the second high-voltage battery 106 should be the same as each other, but the first current I1 and the second current I2 may not be the same due to the physical characteristics of the current path. When the first current I1 supplied to the first high-voltage battery 104 and the second current I2 supplied to the second high-voltage battery 106 are not equal to each other, an imbalance may occur between the battery cells of the first high-voltage battery 104 and the second high-voltage battery 106.

Accordingly, in the charging apparatus for the vehicle of the embodiment, by adjusting the magnitude of the current flowing through each of the first transistor IGBT1 and the second transistor IGBT2 by adjusting the gate voltages V1 and V2 of each of the first transistor IGBT1 and the second transistor IGBT2, the first current I1 supplied to the first high-voltage battery 104 and the second current I2 supplied to the second high-voltage battery 106 are equally controlled. At this time, each of the gate voltages V1 and V2 is greater than 0V to turn on the first transistor IGBT1 and the second transistor IGBT2. However, in order to adjust each of the first current I1 and the second current I2 to have the same magnitude (I1=I2), each of the gate voltages V1 and V2 may have different voltage levels greater than 0V. When I1>I2, I1=I2 may be made by adjusting the magnitudes of the gate voltages V1 and V2 so that V1<V2. Conversely, when I1<I2, I1=I2 may be made by adjusting the magnitudes of the gate voltages V1 and V2 so that V1>V2.

The relationship between the charging current Icharge, the first current I1, and the second current I2 may be expressed as Icharge=I1+I2. From this, it can be seen that the second current I2 is I2=Icharge−I1. Therefore, the two current sensors 108 and 110 alone may measure both the charging current Icharge, the first current I1, and the second current I2.

Figure 3:
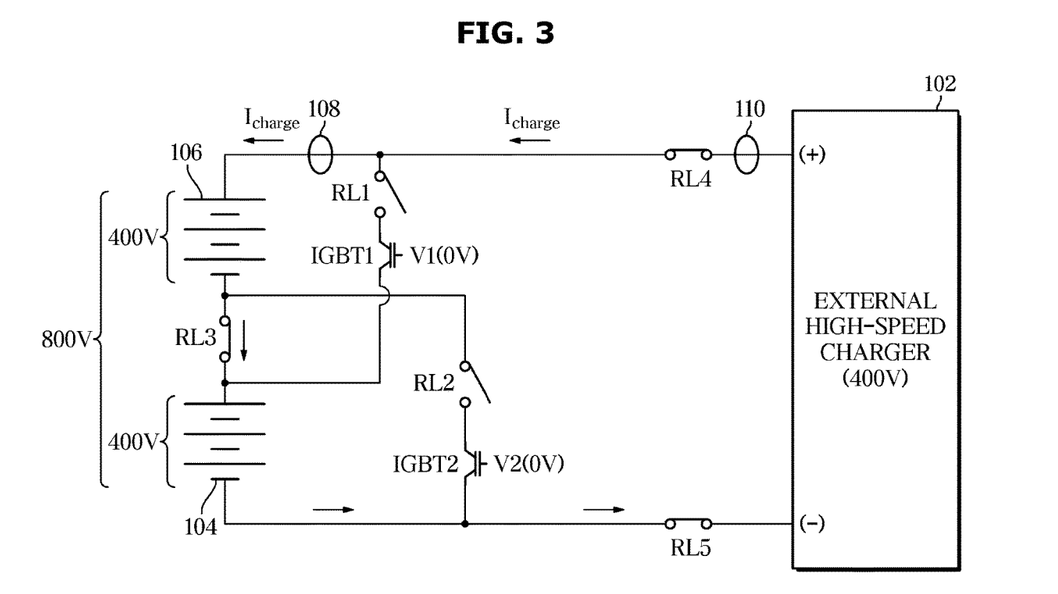
FIG. 3 is a view illustrating charging control for responding to an 800V-class external high-speed charger in a charging apparatus for a vehicle in one form of the present disclosure.

FIG. 3 is a view illustrating charging control for responding to an 800V-class external high-speed charger in a charging apparatus for a vehicle in some forms of the present disclosure. The external high-speed charger 102 illustrated in FIG. 3 is the 800V-class model. In this case, the charging apparatus for the vehicle according to the embodiment may perform charging as one 800V-class high-voltage batteries 104 or 106 without dividing the 800V-class high-voltage batteries 104 and 106.

As illustrated in FIG. 3, when only the third high-voltage relay RL3 is turned on by itself while the first high-voltage relay RL1, the first transistor IGBT1, the second high-voltage relay RL2, and he second transistor IGBT2 are turned off, the first high-voltage battery 104 and the second high-voltage battery 106 are electrically connected in series to be charged as one 800V-class battery.

Since both the first transistor IGBT1 and the second transistor IGBT2 are turned off, the current control through adjustment of the gate voltages V1 and V2 is not required. Therefore, the gate voltages V1 and V2 at this time are all 0V. In addition, the charging current Icharge supplied from the external high-speed charger 102 is sequentially supplied to the second high-voltage battery 106 and the first high-voltage battery 104 as it is to charge the first high-voltage battery 104 and the second high-voltage battery 106.

In response to the 800V-class external high-speed charger 102, if the high-voltage batteries 104 and 106 were charged in the same manner as illustrated in FIG. 3, but when a charging imbalance between the first high-voltage battery 104 and the second high-speed charger 106 is found, as mentioned in the description of FIG. 1 above, only the first high-voltage relay RL1 and the first transistor IGBT1 are turned on to charge only the first high-voltage battery 104 alone. On the contrary, by turning on only the second high-voltage relay RL2 and the second transistor IGBT2 to charge only the second high-voltage battery 106 alone, the charging imbalance between the first high-voltage battery 104 and the second high-speed charger 106 may be eliminated.

Figure 4:
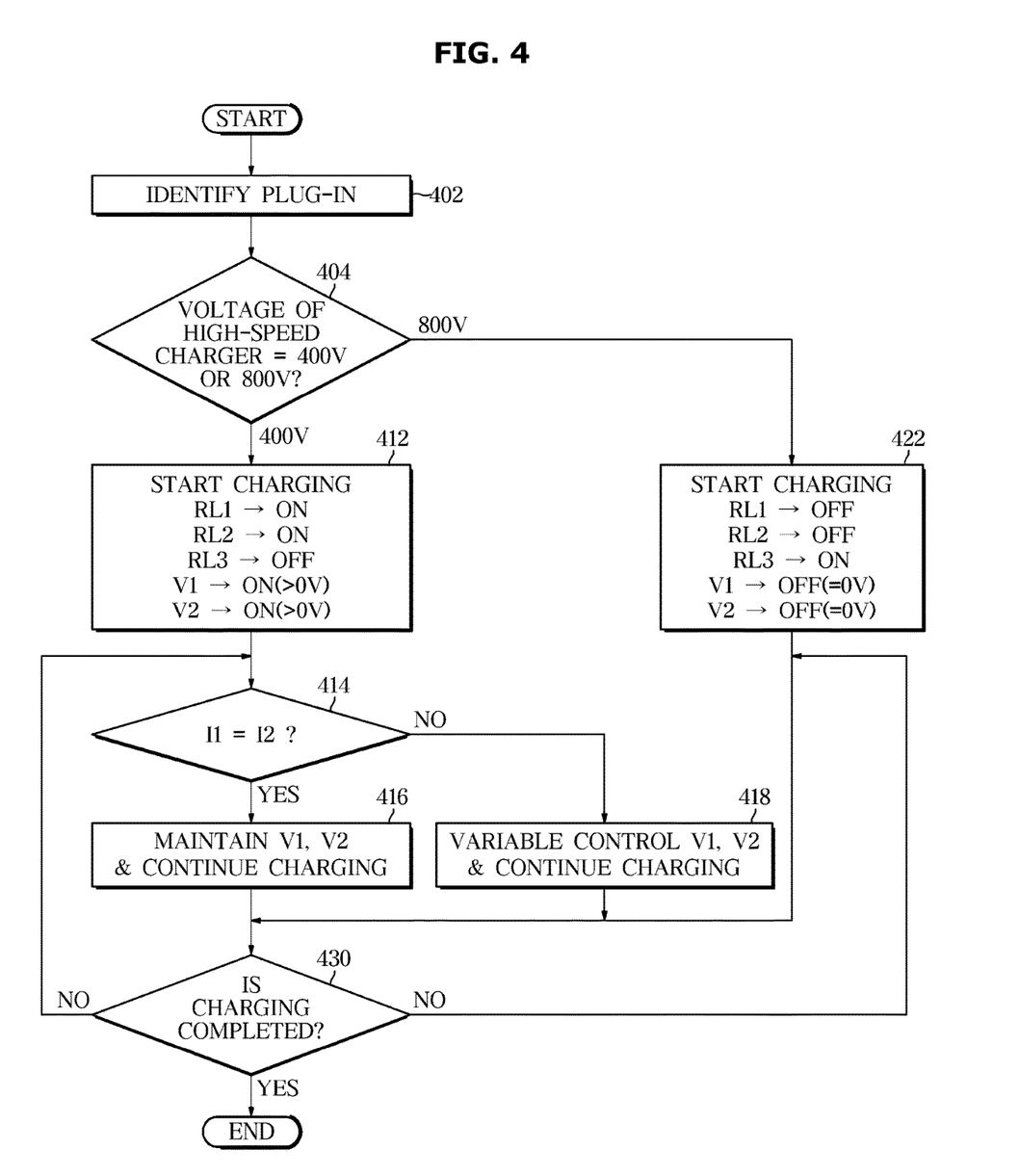
FIG. 4 is a view illustrating a vehicle charging method a charging apparatus for a vehicle in one form of the present disclosure.

FIG. 4 is a view illustrating a vehicle charging method a charging apparatus for a vehicle in some forms of the present disclosure.

The battery management system 112 may identify whether the external high-speed charger 102 is electrically connected to the vehicle by the plug-in (402).

When the external high-speed charger 102 is electrically connected to the vehicle by the plug-in, the battery management system 112 may identify whether a charging voltage of the external high-speed charger 102 is 400V or 800V (404).

When it is identified that the charging voltage of the external high-speed charger 102 is 400V, the battery management system 112 may start so that each of the first high-voltage battery 104 and the second high-voltage battery 106 is independently charged as the 400V-class battery through the following switching control (412). That is, in this case, the battery management system 112 may turn on the first high-voltage relay RL1 and the second high-voltage relay RL2, turn off the third high-voltage relay RL3, as described with reference to FIG. 2, and makes each of the gate voltages V1 and V2 greater than 0V, so that each of the first high-voltage battery 104 and the second high-voltage battery 106 is independently charged as the 400V-class battery.

When the first current I1 for charging the first high-voltage battery 104 and the second current I2 for charging the second high-voltage battery 106 are the same (YES in 414), the battery management system 112 maintains each of the gate voltages V1 and V2 at a value greater than 0V so that independent charging of the first high-voltage battery 104 and the second high-voltage battery 106 continues (416).

When the first current I1 for charging the first high-voltage battery 104 and the second current I2 for charging the second high-voltage battery 106 are not the same (NO in 414), the battery management system 112 may adjust (vary) each of the gate voltages V1 and V2 to a specific value greater than 0V so that the magnitudes of the first current I1 and the second current I2 become the same. The first high-voltage battery 104 and the second high-voltage battery 106 are uniformly charged by adjusting (variable) the first current I1 and the second current I2 (418).

In operation 404, when it is determined that the charging voltage of the external high-speed charger 102 is 800V, the battery management system 112 may start charging to be charged as one 800V-class high-voltage batteries 104 and 106 without dividing the 800V-class high-voltage batteries 104 and 106 through the following switching control (422). That is, in this case, the battery management system 112 may turn off the first high-voltage relay RL1 and the second high-voltage relay RL2, turn on the third high-voltage relay RL3, as described with reference to FIG. 3, and maintain each of the gate voltages V1 and V2 at 0V so that both the first transistor IGBT1 and the second transistor IGBT2 are turned off (422).

When the desired charging of the high-voltage batteries 104 and 106 is completed through such charging (YES in 430), the battery management system 112 may complete charging the high-voltage batteries 104 and 106.

According to the embodiments of the disclosure, the vehicle may respond to a plurality of external chargers having different charging voltages without using a separate boost converter.

The disclosed embodiments is merely illustrative of the technical idea, and those skilled in the art will appreciate that various modifications, changes, and substitutions may be made without departing from the essential characteristics thereof. Therefore, the exemplary embodiments disclosed above and the accompanying drawings are not intended to limit the technical idea, but to describe the technical spirit, and the scope of the technical idea is not limited by the embodiments and the accompanying drawings. The scope of protection shall be interpreted by the following claims, and all technical ideas within the scope of equivalent shall be interpreted as being included in the scope of rights.

What is claimed is:

1. A charging apparatus for a vehicle comprising:
   a first switching element configured to supply or cut off a first charging current supplied to a first battery from an external charger connectable to the vehicle;
   a second switching element configured to supply or cut off a second charging current supplied to a second battery from the external charger connectable to the vehicle;
   a third switching element configured to electrically connect and disconnect the first battery and the second battery to and from each other; and
   a controller configured to:
     control the first switching element, the second switching element, and the third switching element in order to selectively charge at least one of the first battery or the second battery, and,
     when a charging amount of the first battery is different to a charging amount of the second battery, variably adjust via the first switching element a magnitude of the first charging current supplied to the first battery from the external charger connectable to the vehicle or variably adjust via the second switching element a magnitude of the second charging current supplied to the second battery from the external charger connectable to the vehicle so that the charging amount of the first battery is equal to the charging amount of the second battery.

2. The charging apparatus according to claim 1,
   wherein the first switching element comprises a first transistor configured to variably adjust the first charging current via a first gate voltage, or wherein the second switching element comprises a second transistor configured to variably adjust the second charging current via a second gate voltage.

3. The charging apparatus according to claim 2, wherein the first switching element further comprises a first relay configured to turn on or off the first charging current; and
wherein the second switching element further comprises a second relay configured to turn on or off the second charging current.

4. The charging apparatus according to claim 2, wherein the first transistor is an IGBT, and wherein the second transistor is an IGBT.

5. The charging apparatus according to claim 1, wherein the controller is configured to control the first battery and the second battery to be charged as a single battery by turning on the third switching element and turning off the first switching element and the second switching element.

6. The charging apparatus according to claim 1, wherein the controller is configured to control the first battery and the second battery to be independently charged by turning off the third switching element and turning on the first switching element and the second switching element.

7. The charging apparatus according to claim 1, wherein the controller is configured to control only one of the first battery or the second battery to be independently charged by:
turning off the third switching element;
turning on one of the first switching element or the second switching element; and
when the one of the first switching element or the second switching element is turned on, turning off the other of the first switching element or the second switching element.

8. The charging apparatus according to claim 1, wherein the controller is configured to control the first switching element, the second switching element, and the third switching element so that at least one of the first battery or the second battery is selectively charged in response to a charging capacity of the external charger connectable to the vehicle.

9. A method for controlling a charging apparatus for a vehicle, the method comprising:
identifying a charging capacity of an external charger connectable to the vehicle supplying a charging current;
controlling a first switching element, a second switching element, and a third switching element so that at least one of a first battery or a second battery are selectively charged in response to the charging capacity of the external charger connectable to the vehicle; and
when a charging amount of the first battery is different to a charging amount of the second battery, variably adjusting, by the first switching element, a magnitude of a first charging current supplied to the first battery from the external charger connectable to the vehicle or variably adjusting, by the second switching element, a magnitude of a second charging current supplied to the second battery from the external charger connectable to the vehicle so that the charging amount of the first battery is equal to the charging amount of the second battery.

10. The method according to claim 9,
wherein variably adjusting, by the first switching element, the magnitude of the first charging current comprises variably adjusting, by a first transistor included in the first switching element, a supply amount of the first charging current via a first gate voltage, or wherein variably adjusting, by the second switching element, the magnitude of the second charging current comprises variably adjusting, by a second transistor included in the second switching element, a supply amount of the second charging current via a second gate voltage.

11. The method according to claim 10,
wherein the first switching element comprises a first relay, and
wherein the second switching element comprises a second relay.

12. The method according to claim 9, further comprising causing the first battery and the second battery to be charged as a single battery by turning on the third switching element and turning off the first switching element and the second switching element.

13. The method according to claim 9, further comprising causing the first battery and the second battery to be independently charged by turning off the third switching element and turning on the first switching element and the second switching element.

14. A vehicle comprising:
a first battery;
a second battery;
a first switching element configured to supply or cut off a first charging current supplied to the first battery from an external charger connectable to the vehicle;
a second switching element configured to supply or cut off a second charging current supplied from the external charger connectable to the vehicle;
a third switching element coupled between the first battery and the second battery, the third switching element configured to electrically connect and disconnect the first battery and the second battery to and from each other; and
a controller configured to:
control the first switching element, the second switching element, and the third switching element in order to selectively charge at least one of the first battery or the second battery,
when a charging amount of the first battery is different to a charging amount of the second battery, variably adjust via the first switching element a magnitude of the first charging current supplied to the first battery from the external charger connectable to the vehicle or variably adjust via the second switching element a magnitude of the second charging current supplied to the second battery from the external charger connectable to the vehicle so that the charging amount of the first battery is equal to the charging amount of the second battery.

15. The vehicle according to claim 14, wherein the controller is configured to control the first battery and the second battery to be charged as a single battery by turning on the third switching element and turning off the first switching element and the second switching element.

16. The vehicle according to claim 14, wherein the controller is configured to control the first battery and the second battery to be independently charged by turning off the third switching element and turning on the first switching element and the second switching element.

17. The vehicle according to claim 14, wherein the controller is configured to control only one of the first battery or the second battery to be independently charged by:
turning off the third switching element;
turning on one of the first switching element or the second switching element; and when the one of the first switching element or the second switching element is turned on, turning off the other of the first switching element or the second switching element.

18. The vehicle according to claim 14, wherein the controller is configured to control the first switching element, the second switching element, and the third switching element so that at least one of the first battery or the second battery is selectively charged in response to a charging capacity of the external charger connectable to the vehicle supplying the charging current.

19. A method for controlling a charging apparatus for a vehicle, the method comprising:
    identifying a charging capacity of an external charger connectable to the vehicle supplying a charging current; and
    controlling a first switching element between the external charger connectable to the vehicle and a first battery, a second switching element between the external charger connectable to the vehicle and a second battery, and a third switching element between the first battery and the second battery,
    wherein controlling comprises:
        at a first time, causing the first battery and the second battery to be charged as a single battery by turning on the third switching element and turning off the first switching element and the second switching element;
        at a second time, causing the first battery and the second battery to both be charged by turning off the third switching element, turning on the first switching element and the second switching element, and when a charging amount of the first battery is different to a charging amount of the second battery, variably adjusting via the first switching element a magnitude of a first charging current supplied to the first battery from the external charger connectable to the vehicle or variably adjusting via the second switching element a magnitude of a second charging current supplied to the second battery from the external charger connectable to the vehicle so that the charging amount of the first battery is equal to the charging amount of the second battery; and
        at a third time, causing only one of the first battery or the second battery to be charged by turning off the third switching element, turning on one of the first switching element or the second switching element, and turning off the other of the first switching element or the second switching element.

20. The method according to claim 19, wherein causing the first battery and the second battery to both be charged comprises variably adjusting, by a first transistor included in the first switching element, a supply amount of the first charging current via a first voltage, and variably adjusting, by a second transistor included in the second switching element, a supply amount of the second charging current via a second voltage.

21. The method according to claim 19, wherein the first switching element comprises a first relay and wherein the second switching element comprises a second relay.

\* \* \* \* \*